United States Patent [19]

Warren

[11] 4,274,656

[45] Jun. 23, 1981

[54] APPARATUS FOR PREVENTING VEHICLES FROM SLIPPING SIDEWAYS AND GOING OUT OF CONTROL UNDER SNOW AND ICE CONDITIONS

[75] Inventor: Earney R. Warren, Fordland, Mo.

[73] Assignee: Customized Components Co., Springfield, Mo.

[21] Appl. No.: 60,777

[22] Filed: Jul. 26, 1979

[51] Int. Cl.³ .............................................. B60R 27/00
[52] U.S. Cl. ..................................... 280/757; 280/767
[58] Field of Search ................................ 280/767, 757

[56] References Cited

U.S. PATENT DOCUMENTS

| 2,478,653 | 8/1949 | Callan ................................... 280/767 |
| 3,415,537 | 12/1968 | Goggins ................................ 280/757 |
| 3,523,697 | 8/1970 | O'Sullivan ........................... 280/767 |
| 3,711,116 | 1/1973 | Campbell ............................. 280/767 |
| 3,900,119 | 8/1975 | Olsen .................................... 280/767 |

FOREIGN PATENT DOCUMENTS 106831 5/1918 United Kingdom ..................... 280/757

OTHER PUBLICATIONS

Go-Safe Inc., Dec. 2, 1964.

Primary Examiner—John J. Love
Assistant Examiner—Michael Mar
Attorney, Agent, or Firm—F. Travers Burgess

[57] ABSTRACT

Apparatus for preventing road vehicles from slipping sideways and going out of control while operating on snow or ice-covered roads comprising a pair of small steel discs mounted on a common shaft journaled on an arm pivoted to an axle of the vehicle and having mechanism for selectively lowering them from a normal raised position into a road-engaging position when snow or ice conditions are encountered.

7 Claims, 3 Drawing Figures

APPARATUS FOR PREVENTING VEHICLES FROM SLIPPING SIDEWAYS AND GOING OUT OF CONTROL UNDER SNOW AND ICE CONDITIONS

BACKGROUND OF THE INVENTION

Field of the Invention

The invention relates to land vehicles and consists particularly in apparatus to prevent such vehicles from slipping sideways and going out of control during operation on snow-covered or iced roads.

SUMMARY OF THE INVENTION

The invention provides apparatus which can be installed and left on a vehicle permanently for positively preventing sideways slipping and loss of control on iced or snow-covered roads.

An object of the invention is to provide simple, relatively inexpensive apparatus selectively operable to prevent sideways slipping and loss of control of vehicles under snow or iced-road conditions.

A further object is to keep the trailer wheels aligned with the tractor wheels during slick road conditions, when the apparatus is applied to tractor-trailer combination vehicles, so as to prevent sliding and/or jackknifing of the tractor-trailer unit.

DETAILED DESCRIPTION OF THE INVENTION

Figure 1:
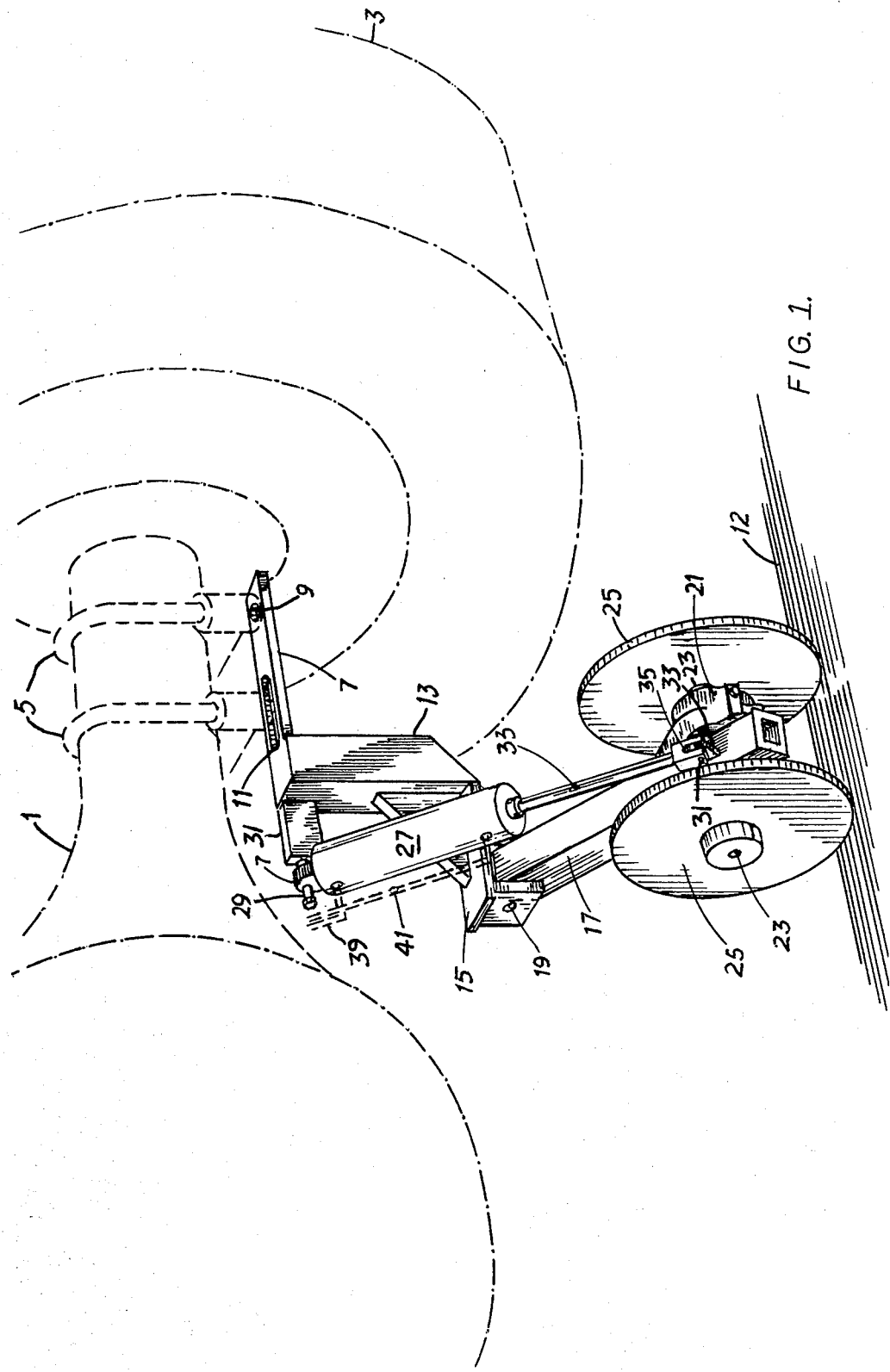
FIG. 1 is a perspective view of apparatus incorporating the invention in operating position, showing its application to a vehicle rear axle.
Figures 2, 3:
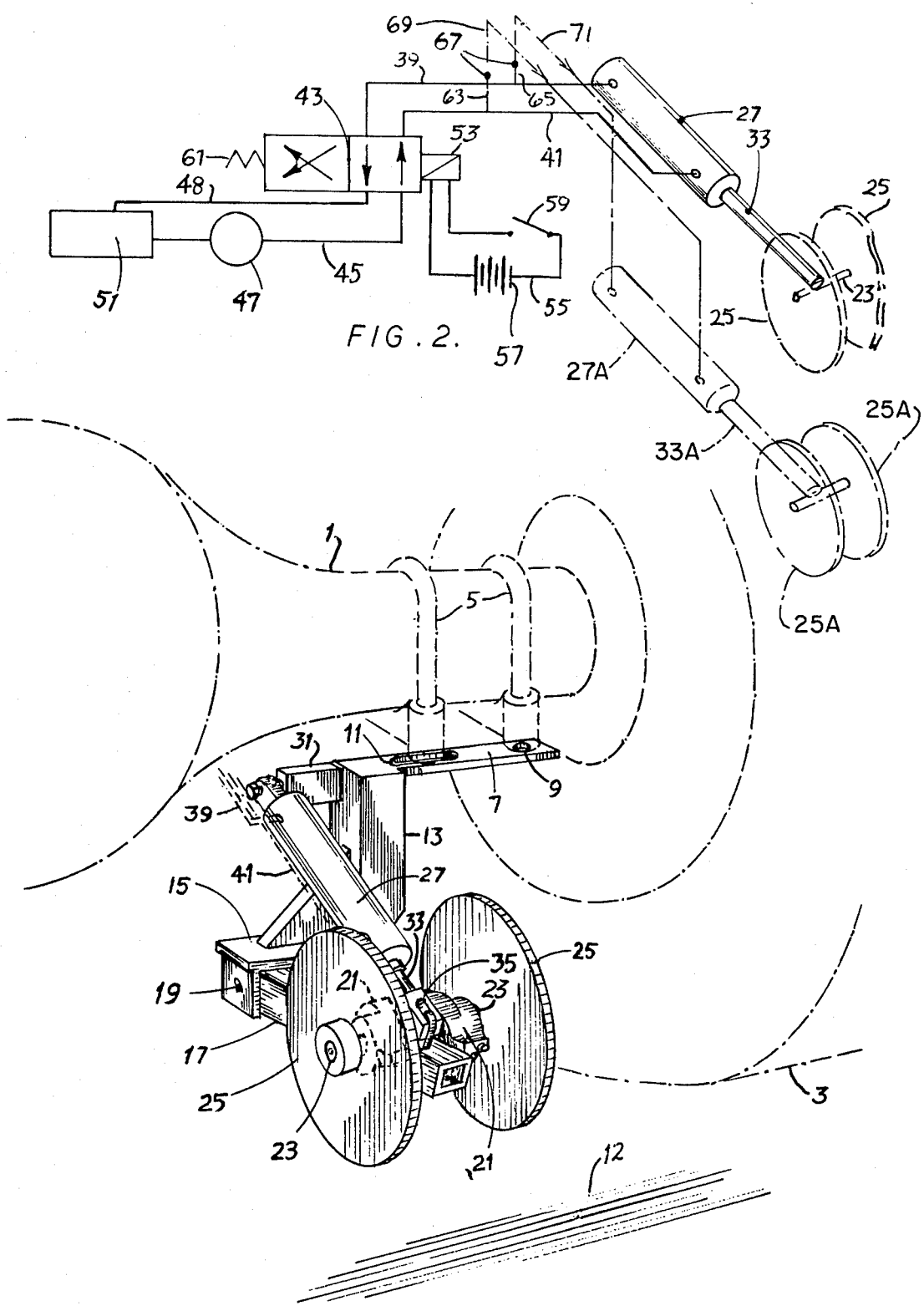
FIG. 2 is a schematic diagram of the electrical and hydraulic systems utilized in the invention.
FIG. 3 is a perspective view similar to FIG. 1, but showing the device in raised position.

As best seen in FIGS. 1 and 3, the numeral 1 denotes the rear axle of a motor vehicle mounting the usual pneumatic tired wheels 3, only one of which is shown, and having inboard of the wheels the usual spring U-bolts 5.

Apparatus incorporating the invention has a horizontal mounting plate 7 formed with a hole 9 near its outboard end to receive one of the U-bolts and a slot 11 spaced inboard from hole 9 to receive the other U-bolt, slot 11 being elongated to accommodate different spacing of the U-bolts. A leg 13 extends downwardly from the inboard end of mounting plate 7 and at its lower end mounts an inwardly extending downwardly open clevis bracket 15. A movable arm 17 is pivoted to clevis bracket 15 by means of a pin 19 having its axis parallel to axle 1, i.e., transverse of the vehicle. At its lower end pivoted arm 17 mounts a pair of bearings 21 having a common axis parallel to the axis of axle 1 and of pivot pin 19 and a short shaft 23 is journaled in bearings 21 and fixedly mounts on its protruding ends a pair of steel plate discs 25. In FIG. 1, discs 25 are in their lowered operative position in engagement with road surface 12. For selectively raising and lowering discs 25 out of and into road engaging position, as shown in FIG. 1, a fluid (preferably hydraulic) cylinder 27 is pivoted at its upper end at 29 to a cylinder support bracket 31 mounted on the upper end of vertical leg 13 and the piston rod 33 of cylinder 27 is formed at its lower end with a clevis 35 secured to an upstanding bracket 37 on the lower or rear end portion of pivoted arm 17 by means of a pin 39 extending parallel to axle 1, pivot pin 19 and shaft 23.

From the foregoing it will be seen that by selective admission of fluid to the upper end of hydraulic cylinder 27, arm 17 and with it shaft 23 and discs 25 may be lowered into engagement with the road surface 12, as seen in FIG. 1, and by admission of fluid to the lower end of cylinder 27, pivoted arm 17, shaft 23 and discs 25 may be raised out of engagement with the road surface 12 and into a normal traveling position.

For providing for selective admission of fluid to the opposite ends of cylinder 27, fluid conduits 39 and 41 connected respectively to the upper and lower ends of cylinder 27 are connected at their opposite ends to a four-way, two-position solenoid valve 43, which in turn is connected by fluid conduit 45 containing a pressure regulator 47 to a source 51 of fluid under pressure. A return conduit 48 extends from valve 43 to fluid pressure source 51. For energizing solenoid 53 of valve 43, an electrical circuit 55 includes the vehicle battery 57 or other source of electrical power and a switch 59 mounted in the vehicle cab so that when the vehicle driver encounters conditions which might cause skidding, by closing switch 59 he can cause fluid under pressure to flow through valve 43 and line 39 to the upper end of cylinder 27, thereby moving discs 25 from their normal raised position, as shown in FIG. 3, to their lowered road-engaging position, shown in FIG. 1, wherein the edges of discs 25 dig into the snow or ice and prevent any sideways motion of the vehicle without interfering with longitudinal motion. When the dangerous road conditions have been passed, the driver can open switch 59 to de-energize solenoid 53 and permit return spring 61 to return valve 43 to its normal position, wherein fluid under pressure passes from pressure source 51 via conduit 45, valve 43 and conduit 41 to the lower end of cylinder 27, thereby raising discs 25 from road-engaging position to normal travel position, as shown in FIG. 3.

If a trailer or semi-trailer is used with the vehicle to which the invention is applied, fluid conduits 39 and 41 may be provided with branches 63 and 65, terminating in couplings 67 and the trailer or semi-trailer may be provided with a similar device operated by fluid conduits 69 and 71 coupled to branch conduits 63 and 65 by couplings 67.

The details of the apparatus disclosed herein may be modified substantially without departing from the spirit of the invention and the exclusive use of all such modifications as come within the scope of the appended claims is contemplated.

I claim:

1. Apparatus for preventing vehicles from slipping sideways on slick road surfaces comprising a freely rotatable disc structure having a shaft parallel to the axis of the vehicle wheels and a pair of separate discrete discs mounted in spaced relation with each other on the respective end portions of said shaft to define between them a radially deep circumferential space and each having a single metal platelike circumferential edge capable of cutting into pavement ice and the like, support structure including a mounting element arranged for securement to an upsprung portion of a vehicle and an arm extending rearwardly from said element, a pivotal connection located at the forward end of said arm on an axis parallel to the axis of the vehicle wheels, means rotatably mounting said shaft on the rear end portion of said arm, said discs being positioned on opposite sides of said arm, and selectively actuatable means for extending and retracting said arm comprising a fluid cylinder and piston assembly connected at one end to said mounting element and at its other end to said arm.

2. Apparatus according to claim 1, wherein said mounting element has a horizontal plate suitably perforated for attachment to a vehicle axle, a vertical leg depending therefrom, said pivotal connection being on the lower portion of said leg, said cylinder and piston assembly being pivotally connected at its upper end to the upper portion of said leg and to the rear portion of said arm.

3. Apparatus according to claim 1, wherein said selectively actuable means includes a source of fluid pressure, conduit means connecting said source and said cylinder, and valve means in said conduit means selectively controlling the admission of fluid to said cylinder.

4. Apparatus according to claim 3, wherein said conduit means includes separate conduits connected to respectively opposite ends of said cylinder and said valve means comprises a four-way, two-position valve for reversing the flow between said fluid pressure source and said cylinder.

5. Apparatus according to either of claims 3 or 4, wherein said selectively actuable means includes a solenoid operatively connected to said valve means, and an electric circuit including said solenoid, a source of electrical energy and a switch for closing and opening said circuit and thereby energizing and de-energizing said solenoid.

6. Apparatus according to claim 3 including means for connecting said conduit means to a cylinder controlling similar discs on a coupled vehicle, whereby to provide simultaneous movement of the discs on both vehicles.

7. Apparatus according to claim 4, including means for connecting both of said fluid conduits to a cylinder controlling similar discs on a coupled vehicle, whereby to provide simultaneous movement of the discs on both vehicles into and away from road-engaging positions.

* * * * *